United States Patent
Schmid et al.

(10) Patent No.: US 7,412,963 B2
(45) Date of Patent: Aug. 19, 2008

(54) INTERNAL COMBUSTION ENGINE INCLUDING A GAS PRESSURE CONTAINER ASSIGNED TO THE CYLINDERS, AND METHOD FOR OPERATING THE ENGINE

(75) Inventors: Wolfram Schmid, Nürtingen (DE); Siegfried Sumser, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 11/879,031

(22) Filed: Jul. 13, 2007

(65) Prior Publication Data

US 2008/0006251 A1 Jan. 10, 2008

Related U.S. Application Data

(63) Continuation-in-part of application No. PCT/EP2005/013268, filed on Dec. 10, 2005.

(30) Foreign Application Priority Data

Jan. 14, 2005 (DE) .................. 10 2005 001 757

(51) Int. Cl.
*F01L 13/06* (2006.01)
*F01L 13/00* (2006.01)
(52) U.S. Cl. .................. 123/320; 123/322; 123/568.21
(58) Field of Classification Search ......... 123/320–324, 123/327, 402, 42.31, 568.21, 568.12, 568.14, 123/316, 562; 60/605.2
See application file for complete search history.

(56) References Cited

U.S. PATENT DOCUMENTS 3,958,900 A * 5/1976 Ueno .................. 417/237
4,506,633 A * 3/1985 Britsch .................. 123/58.8
4,565,167 A * 1/1986 Bryant .................. 123/70 R
4,741,307 A * 5/1988 Meneely .................. 123/321
4,848,289 A * 7/1989 Meneely .................. 123/182.1
5,115,790 A * 5/1992 Kawamura .............. 123/568.2
6,328,003 B1 12/2001 Gaertner et al.
6,478,009 B1 * 11/2002 Seitz et al. .................. 123/321
6,779,506 B1 * 8/2004 Beaucaire et al. ........... 123/321
7,314,037 B2 * 1/2008 Roithinger .................. 123/316
2002/0162530 A1 * 11/2002 Seitz et al. .................. 123/321
2006/0260567 A1 * 11/2006 Roithinger ................ 123/41.31

FOREIGN PATENT DOCUMENTS

| DE | 24 31 828 | 1/1975 |
| DE | 101 44 471 A1 | 3/2002 |
| EP | 0 531 277 A2 | 3/1993 |
| WO | 2004/074648 A1 | 9/2004 |

\* cited by examiner

*Primary Examiner*—Mahmoud Gimie
(74) *Attorney, Agent, or Firm*—Klaus J. Bach

(57) ABSTRACT

In an internal combustion engine having cylinders connected by means of controllable brake valves to a common gas pressure container which is in communication, by way of an outflow line with an outflow valve, with the exhaust strand of the internal combustion engine, an inlet gas pressure container is connected to the intake tract of the internal combustion engine and is in communication with the common pressure container by means of a recirculation line having a controllable check valve arranged therein permitting the establishment of various engine operating and control features.

12 Claims, 1 Drawing Sheet

INTERNAL COMBUSTION ENGINE INCLUDING A GAS PRESSURE CONTAINER ASSIGNED TO THE CYLINDERS, AND METHOD FOR OPERATING THE ENGINE

This is a Continuation-In-Part Application of pending International Patent Application PCT/EP2005/013268 filed Dec. 10, 2005 and claiming the priority of German Patent Application 10 2005 001 757.6 filed Jan. 14, 2005

BACKGROUND OF THE INVENTION

The invention relates to an internal combustion engine including a gas pressure container assigned in communication with the cylinders for supplying compressed combustion air to the container and to a method for operating such an internal combustion engine.

Document DE 101 44 471 A1 discloses a multi-cylinder reciprocating-piston internal combustion engine which has a tubular pressure container (brake rail) which is connected by way of, in each case, one brake valve to each cylinder of the internal combustion engine. In the braking mode of the internal combustion engine, the brake valves are opened and closed multiple times per working cycle, so that highly-compressed air passes from the cylinder into the pressure container, and braking power is generated. After the closure of the intake valve at the cylinder, the respective brake valve is briefly opened again, so that the compressed combustion air flows back out of the pressure container into the combustion chamber of the cylinder, and, as a result, the piston in the cylinder must exert compression work against the compressed air. This further increases the braking power of the engine.

The gas pressure container is also connected to the exhaust strand of the internal combustion engine by means of an outflow line having an adjustable outflow valve arranged therein, so that, when the outflow valve is opened, the gas content can flow out of the gas pressure container into the exhaust strand. Impermissibly high pressures are avoided in this way.

It is the object of the present invention to create, using simple measures, additional possibilities for use of an internal combustion engine whose cylinders are connected by means of, in each case, one adjustable brake valve to a common gas pressure container.

SUMMARY OF THE INVENTION

In an internal combustion engine having cylinders connected by means of controllable brake valves to a common gas pressure container which is in communication, by way of an outflow line with an outflow valve, with the exhaust strand of the internal combustion engine, an inlet gas pressure container is connected to the intake tract of the internal combustion engine and is in communication with the common pressure container by means of a recirculation line having a controllable check valve arranged therein permitting the establishment of various engine operating and control features.

With the controllable check valve arranged in the exhaust gas recirculation line between the two gas containers, various additional adjustment possibilities and operating modes in comparison with the prior art arrangement. For example, it is possible to carry out exhaust gas recirculation in which exhaust gas from the cylinders is initially conducted, with the brake valves open, into the common gas pressure container, and the exhaust gas is subsequently supplied to the intake tract from the common gas pressure container by opening the controllable check valve in the recirculation line. This operating mode according to the invention can be referred to as external exhaust gas recirculation, in contrast to internal exhaust gas recirculation in which exhaust gas is recirculated from the gas pressure container directly into the cylinders via the open brake valves during operating phases in which the cylinder internal pressure is lower than the pressure in the common gas pressure container. Internal and external exhaust gas recirculation represent alternative operating modes for the recirculation of the exhaust gas.

In a further operating mode according to the invention, in order to obtain a so-called rich air/fuel mixture, which is required in the exhaust gas aftertreatment system of the internal combustion engine in order to reduce nitrogen oxides ($NO_x$), the brake valves at the cylinders can be briefly opened during a compression stroke. Combustion air is thereupon ejected from the cylinders into the gas pressure container so that, during the combustion phase, only a relatively small air quantity is available and a correspondingly enriched air/fuel mixture with a relatively high fuel proportion is generated. The result is an increased CO proportion in the exhaust gas, which functions as a reducing agent for the nitrogen oxides.

Also possible is the generation of a lean air/fuel mixture, by virtue of combustion air being recirculated from the gas pressure container into the intake tract via the recirculation line.

In another operating mode according to the invention, in order to realize an engine braking mode, the brake valve at the cylinder and also the controllable check valve in the recirculation line is opened, so that the brake valve or brake valves act in a known way as a constant throttle. On account of the open check valve, a recirculation of the cylinder content, which is ejected into the gas pressure container, back into the intake tract is generated. This recirculation can, however, according to a further expedient embodiment, be generated by means of a controlled adjustment of the position of the outflow valve in the outflow line between the gas pressure container and the exhaust strand. The pressure in the gas pressure container and the recirculation rate via the recirculation line are set by means of the released cross section in the outflow valve. If the recirculation rate is reduced by fully opening the outflow valve, then the engine throughput can be increased and the gas temperature in the cylinders can be reduced for the same engine braking power. The increase in the air quantity can be carried out at the nominal rotational speed in the engine braking mode up to the maximum permissible rotational speed of an exhaust gas turbocharger of the internal combustion engine.

The engine braking power can however also be set merely by means of the controllable check valve in the recirculation line. In this case, the outflow valve expediently remains completely or at least largely closed.

It is possible for the engine braking power to be set by means of an interaction of the outflow valve on the one hand and of the check valve in the recirculation line on the other hand. It is hereby also possible in particular to realize a cruise control function of the vehicle, in which, in the engine braking mode, a constant vehicle speed is set as a function of external conditions, in particular of the momentary grade.

In a further preferred embodiment, the internal combustion engine is equipped with an exhaust gas turbocharger with a compressor in the intake tract and an exhaust gas turbine in the exhaust strand, with the exhaust gas turbine expediently having a variable turbine geometry for variably adjusting the effective turbine inlet cross section. This results in additional adjustment possibilities, since the position of the variable turbine geometry constitutes a further degree of freedom by means of which the exhaust gas counter-pressure and therefore for example the turbine power and the engine braking power can be influenced. The cruise control function can for example also be realized by means of an adjustment of the variable turbine geometry.

The invention will become more readily apparent from the following description of a particular embodiment thereof on the basis of the accompanying drawings.

BRIEF DESCRIPTION OF THE DRAWINGS

The sole FIGURE illustrates a preferred exemplary embodiment of a charged internal combustion engine whose cylinders are connected to a common gas pressure container.

DESCRIPTION OF A PREFERRED EMBODIMENT

Figure 1:
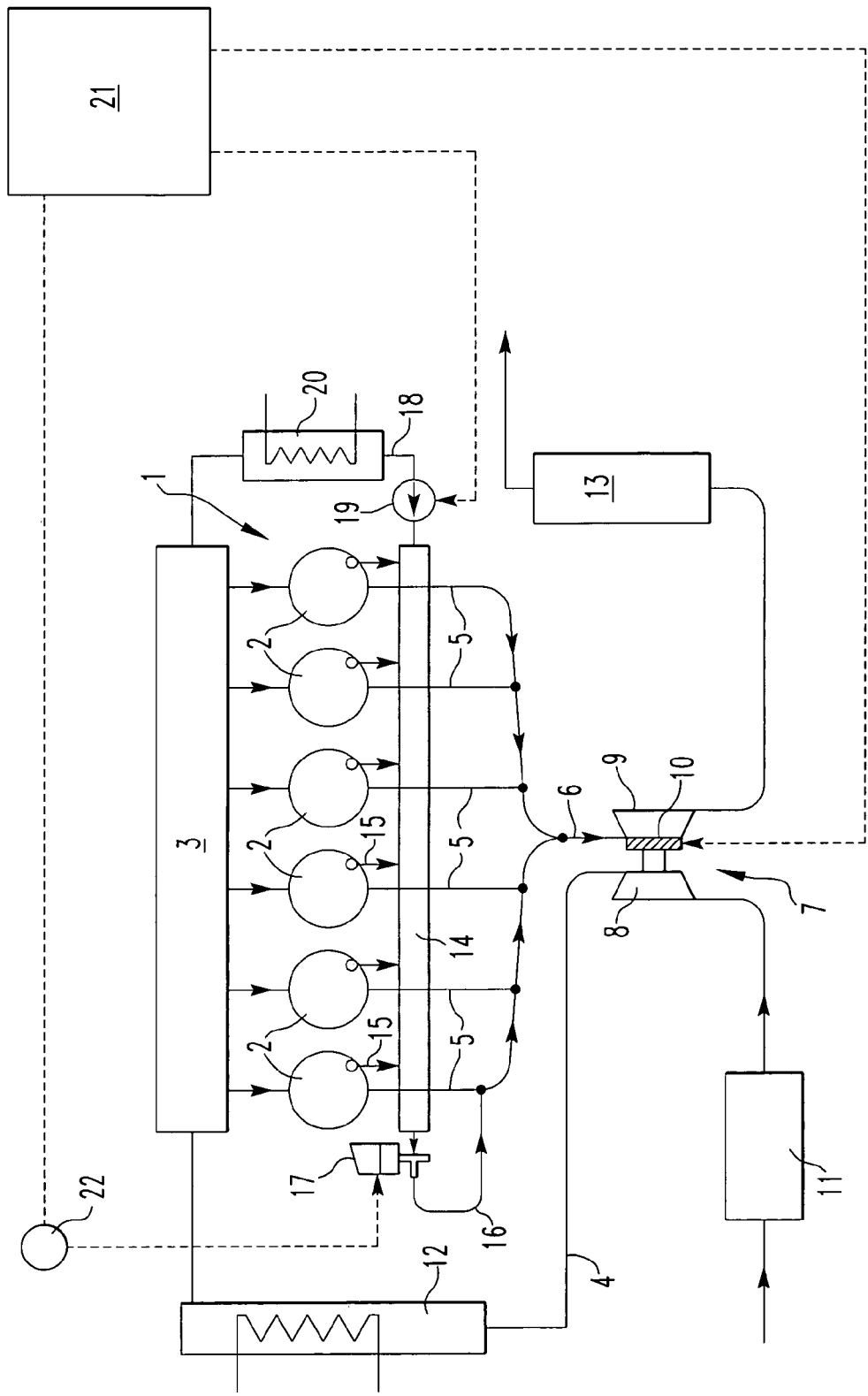

The multi-cylinder reciprocating-piston internal combustion engine 1—a spark-ignition engine or a diesel engine—comprises a plurality of cylinders 2, to which combustion air is to be supplied via a common intake air accumulator 3, and whose exhaust gases are conducted via in each case one exhaust manifold 5 into an exhaust strand 6. The air accumulator 3 is connected directly upstream of the cylinders 2 of the internal combustion engine 1 and is situated in the intake tract 4 of the internal combustion engine.

The internal combustion engine 1 includes an exhaust gas turbocharger 7 which comprises a compressor 8 in the intake tract 4 and an exhaust gas turbine 9 in the exhaust strand 6. The compressor wheel of the compressor 8 and the turbine wheel of the exhaust gas turbine 9 are rotationally fixedly connected to one another. The exhaust gas of the internal combustion engine 1 drives the turbine wheel, whose rotational movement is transmitted, on account of the rotationally fixed coupling, to the compressor wheel, whereupon the compressor 8 sucks in combustion air from the environment and compresses it to an increased charge pressure. The exhaust gas turbine 9 is equipped with a variable turbine geometry 10, by means of which the effective turbine inlet cross section can be adjusted between a minimizing blocking position and a maximum opening position. The variable turbine geometry is for example embodied as an axially adjustably movable guide vane structure or as a fixed guide vane structure with adjustable guide vanes.

The combustion air is initially cleaned in the intake tract 4 in an air filter 11 which is arranged upstream of the compressor 8. Situated downstream of the compressor 8 in the intake tract 4 is a charge air cooler 12 in which the air, which is compressed by the compressor 8 and thereby heated, is initially cooled. After the cooling in the charge air cooler 12, the combustion air is conducted into the common inlet air accumulator 3. From there the compressed combustion air is supplied to the cylinders 2 of the internal combustion engine.

At the exhaust gas side, the exhaust gases produced in the internal combustion engine are conducted via the exhaust strand 6 initially into the exhaust gas turbine 9, are expanded therein and, in the further course downstream of the exhaust gas turbine, are conducted through an exhaust gas treatment device 13, in which the exhaust gases are purified out. The exhaust gas treatment unit 13 comprises in particular a catalytic converter and if appropriate an exhaust gas filter.

The internal combustion engine 1 is also equipped with a gas pressure container 14, which is a common high-pressure gas rail for all the cylinders 2 of the internal combustion engine. Each cylinder 2 is connected by means of in each case one brake valve 15 to the gas pressure container 14. In the open position of the brake valves 15, the cylinder content of the respective cylinder 2 communicates with the gas pressure container, and in the blocking position, a gas exchange between the cylinders and the gas pressure container 14 is prevented. The brake valves 15 at each cylinder 2 are provided in addition to the intake and exhaust valves at the particular cylinder.

The gas pressure container 14 is connected by means of an outflow line 16 with an adjustable outflow valve 17 to the exhaust strand 6 of the internal combustion engine. When the outflow valve 17 is open, the gas content of the gas pressure container 14 is flow-connected to the exhaust strand 6.

The gas pressure container 14 is additionally connected, by means of a recirculation line 18, to the inlet air accumulator 3. Disposed in the recirculation line 18 are an adjustable check valve 19 and a cooler 20. In the open position of the check valve 19, the content of the gas pressure container 14 is flow-connected to the inlet air accumulator 3. When the valve is in a blocking position, the flow connection is interrupted.

The controllable check valve 19 and expediently also the outflow valve 17 are in each case designed so as to be stable with respect to pressure pulsations. This can be obtained for example by means of an embodiment as a rotary slide valve.

The internal combustion engine 1 additionally includes a control unit 21 which, as a function of conditions and operating variables of the internal combustion engine 1 and of equipment with which the internal combustion engine is provided, generates actuating signals for controlling all of the actuating units of the internal combustion engine. To be controlled are in particular the variable turbine geometry 10, the outflow valve 17 in the outflow line 16 between the gas pressure container 14 and the exhaust strand 6, and the adjustable check valve 19 in the recirculation line 18 between the gas pressure container 14 and the inlet air accumulator 3. The control unit 21 also measures the state of a brake switch 22 which can be actuated by the driver for manually adjusting the outflow valve 17 and therefore for adjusting the pressure in the gas pressure container 14. An automatic adjustment of the outflow valve 17 without driver intervention is however also possible by means of the control unit 21.

The gas pressure container 14 which communicates with the cylinders 2 makes various operating modes of the internal combustion engine possible. It is possible in particular by means of an adjustment of the valves 15, 17 and 19, which are assigned to the gas pressure container 14, to influence the engine braking mode, exhaust gas recirculation and exhaust gas enrichment operating modes.

In the engine braking mode, a distinction can be made between engine braking in the low engine speed range and engine braking in the middle and high engine speed rangs. In the low engine rotational speed range, the degree of charging which can be obtained by means of the exhaust gas turbine 7 using a corresponding blocking position of the variable turbine geometry 10 is still relatively low, because of a comparatively low exhaust gas counter-pressure in the exhaust strand 6 upstream of the exhaust gas turbine 9. The engine braking mode is produced in this phase in that the brake valves 15 between the cylinders 2 and the gas pressure container 14 are opened and closed in a clocked fashion. Two brief opening phases of each brake valve expediently take place per engine revolution, with a first opening phase of the brake valves taking place close to top dead center of the compression stroke, whereupon combustion air which is compressed in the cylinder can flow out into the gas pressure container 14 via the open brake valves 15. The second opening phase takes place in the same working cycle shortly after the closure of the intake valves of the cylinders, whereupon compressed air flows back out of the gas pressure container 14 into the combustion chambers of the cylinders 2 on account of a pressure gradient. The internal combustion engine must then exert an increased amount of compression work against the increased cylinder internal pressure, which increases the braking power.

In the middle and high engine rotational speed range, the degree of charging in the exhaust gas turbocharger is dramatically increased, and the exhaust gas counter-pressure is at a correspondingly high level. The clocking of the brake valves 15 is expediently largely stopped, and the brake valves 15 are in principle held constantly open in the manner of constant throttles which are known per se. The outflow valve 17, too, is opened to a greater or lesser extent, so that the same exhaust gas counter-pressure prevails in the gas pressure container 14 as in the exhaust strand 6 upstream of the exhaust gas turbine 9. In the compression phase, the pistons in the cylinders 2 must exert compression work against said increased exhaust gas counter-pressure. At the same time, in the exhaust gas turbine 9, the highly pressurized exhaust gas flows through the remaining free flow cross sections in the variable turbine geometry 10 to the turbine wheel, and imparts a driving impetus to the latter, whereupon combustion air is sucked in and compressed at the compressor side, and said compressed air is supplied to the cylinders. The pressure level is in this way also increased on the air side.

The exhaust gas counter-pressure level is controlled by adjusting the position of the variable turbine geometry 10, in the exhaust gas turbine 9. The pressure level in the gas pressure container 14 can be influenced by controlling the position of the outflow valve 17 in the outflow line 16. At the fully open position of the outflow valve 17, pressure equalization takes place between the gas pressure in the gas pressure container 14 and the exhaust gas counter-pressure in the exhaust strand 6 upstream of the exhaust gas turbine 9. When the outflow valve 17 is closed or only partially open, it is also possible for a pressure gradient to be generated between the gas pressure container 14 and the exhaust strand 6.

A further adjustment possibility resides in controlling the adjustable check valve 19 in the recirculation line 18. When the check valve 19 is open, the air from the gas pressure container 14—which is if appropriate mixed with exhaust gas—can flow over into the air accumulator 3 via the recirculation line 18, as a result of which the pressure level on the air side of the cylinder can be increased. In this phase, the outflow valve 17 either remains completely closed or is only partially opened. In this engine braking operating phase, the brake valves 15 are advantageously constantly open.

The engine braking power can be controlled by adjusting the outflow valve 17 and/or the check valve 19 in the recirculation line 18. It is for example possible to realize a cruise control function using the engine brake by virtue of the engine braking power being set to the present situation by means of an adjustment of said valves such that the vehicle travels at a constant speed. An additional possibility for influence resides in the positioning of the variable turbine geometry 10. By adjusting the outflow valve 17, the check valve 19 and the variable turbine geometry 10, it is possible to meet additional boundary conditions; for example, the mechanical and thermal loading of components can be kept within permissible limit values even at high engine braking power levels.

In a further expedient operating phase, it is possible to carry out exhaust gas recirculation by way of the gas pressure container 14. This is done in such a way that, in certain engine operating ranges, for example at low part-load or at high load and high engine rotational speeds, at least a part of the recirculation exhaust gas is returned via the line 18 to the air side of the internal combustion engine. For this purpose, the brake valves 15 are briefly opened during the exhaust stroke, so that exhaust gas can flow out of the cylinders into the gas pressure container 14 via the brake valves 15. The brake valves are subsequently closed and the check valve 19 is opened, so that the exhaust gas can flow over from the gas pressure container 14 into the air accumulator 3 via the recirculation line 18. This operating mode is referred to as external exhaust gas recirculation. If appropriate, the outflow valve 17 can be opened, so that the exhaust gas from the exhaust strand 6 upstream of the exhaust gas turbine 9 can likewise flow into the gas pressure container 14.

There is the possibility, of providing for so-called internal exhaust gas recirculation, with the check valve 19 closed—and with the outflow valve 17 expediently also closed—by briefly opening the brake valves 15 during the exhaust stroke, so that the exhaust gas flows over from the cylinders into the gas pressure container 14, and briefly opening said brake valves 15 again during the intake tract, so that the exhaust gas can flow back out of the gas pressure container 14 into the cylinders 2 thereby increasing the pressure during the compression stroke.

As a further method, it is possible, in order to enrich the exhaust gas, that is to say to obtain a relative excess of fuel in the air/fuel mixture with $\lambda<1$, for the brake valves at the cylinders 2 to be briefly opened during the compression stroke, whereupon combustion air is released from of the cylinders into the gas pressure container 14. For the combustion phase, there is then a relatively small air quantity available while engine torque to be generated remains the same; the combustion in the cylinders takes place with an enriched mixture. As a result, the carbon monoxide proportion in the exhaust gas increases, which carbon monoxide can be used in the exhaust gas treatment unit 13 as a reducing agent for reducing the nitrogen oxides.

The combustion air which is ejected into the gas pressure container is supplied, for example after the nitrogen oxide reduction is carried out, from the gas pressure container 14 back to the cylinders during the exhaust phase by opening the brake valves 15. It is further possible, as a further measure which can be carried out alternatively or cumulatively, for the air which is under increased pressure to be discharged from the gas pressure container 14 into the exhaust strand 6 by opening the outflow valve 17. In addition, the air can be supplied to the intake side of the internal combustion engine via the recirculation line 18 by opening the check valve 19; this possibility can also be carried out alternatively or cumulatively.

What is claimed is:

1. An internal combustion engine, including a number of cylinders (2), an intake tract (4) connected to the cylinders (2) for supplying combustion air thereto, a common gas pressure container (14) in communication with the cylinders, each via an adjustable brake valve (15) for controlling compressed gas flow out of the cylinders (2) and into the gas pressure container (14), an exhaust strand (6) for discharging exhaust gas from the engine and an outflow line (16) extending from the common gas pressure container to the exhaust strand (6), an outflow valve (17) disposed in the outflow line (16) for controlling the release of compressed gas from the common pressure container (14) to the exhaust strand (6), and a recirculation line (18) extending from the common pressure container (14) to the intake tract (4) of the internal combustion engine and including an adjustable check valve (19) for controlling the gas recirculation flow from the common pressure container (14) to the intake tract (4), and a control unit (21) for controlling the adjustable brake valves (15), the outflow valve

(17) and the adjustable check valve (19) for controlling the pressure in the pressure container (14) and, as a result, the engine braking power and also internal and external exhaust gas recirculation via the recirculation line (18).

2. The internal combustion engine as claimed in claim 1, wherein a cooler (20) is arranged in the recirculation line (18).

3. The internal combustion engine as claimed in claim 1, wherein an accumulator (3) is arranged in the intake tract (4) directly upstream of the cylinders (2) of the internal combustion engine (1), the recirculation line (18) being in communication with the air accumulator (3).

4. The internal combustion engine as claimed in claim 1, wherein the internal combustion engine (1) is equipped with an exhaust gas turbocharger (7) having a compressor (8) disposed in the intake tract (4) and an exhaust gas turbine (9) disposed in the exhaust strand (6).

5. The internal combustion engine as claimed in claim 4, wherein the exhaust gas turbine (9) has a variable turbine geometry (10) for variably adjusting the effective turbine inlet flow cross section.

6. The internal combustion engine as claimed in claim 4, wherein the check valve (19) is a rotary slide valve.

7. A method for operating an internal combustion engine including a number of cylinders (2), an intake tract (4) connected to the cylinders (2) for supplying combustion air thereto, a common gas pressure container (14) in communication with the cylinders, each via an adjustable brake valve (15) for controlling compressed gas flow out of, and into, the cylinders (2), an exhaust strand (6) for discharging exhaust gas from the engine and an outflow line (16) extending from the common gas pressure container to the exhaust strand (6), an outflow valve (17) disposed in the outflow line (16) for controlling the release of compressed gas from the common pressure container (14) to the exhaust strand (6), and a recirculation line (18) extending from the common pressure container (14) to the intake tract (4) of the internal combustion engine and including an adjustable check valve (19) for controlling the gas recirculation flow from the common pressure container (14) to the intake tract (4), said method comprising the steps of: in order to recirculate exhaust gas into the intake tract (4), briefly opening the brake valves (15) at the cylinders (2) during the exhaust stroke, and subsequently opening the controllable check valve (19) in the recirculation line (18) between the gas pressure container (14) and the intake tract (4).

8. A method for operating an internal combustion engine including a number of cylinders (2), an intake tract (4) connected to the cylinders (2) for supplying combustion air thereto, a common gas pressure container (14) in communication with the cylinders, each via an adjustable brake valve (15) for controlling compressed gas flow out of, and into, the cylinders (2), an exhaust strand (6) for discharging exhaust gas from the engine and an outflow line (16) extending from the common gas pressure container to the exhaust strand (6), an outflow valve (17) disposed in the outflow line (16) for controlling the release of compressed gas from the common pressure container (14) to the exhaust strand (6), and a recirculation line (18) extending from the common pressure container (14) to the intake tract (4) of the internal combustion engine and including an adjustable check valve (19) for controlling the gas recirculation flow from the common pressure container (14) to the intake tract (4), said method comprising the steps of: in order to enrich the exhaust gas, briefly opening the brake valves (15) at the cylinders (2) during the compression stroke, so that combustion air is discharged into the gas pressure container (14) and subsequently opening the outflow valve (17) for discharging combustion air to the exhaust strand (6).

9. A method for operating an internal combustion engine including a number of cylinders (2), an intake tract (4) connected to the cylinders (2) for supplying combustion air thereto, a common gas pressure container (14) in communication with the cylinders, each via an adjustable brake valve (15) for controlling compressed gas flow out of, and into, the cylinders (2), an exhaust strand (6) for discharging exhaust gas from the engine and an outflow line (16) extending from the common gas pressure container to the exhaust strand (6), an outflow valve (17) disposed in the outflow line (16) for controlling the release of compressed gas from the common pressure container (14) to the exhaust strand (6), and a recirculation line (18) extending from the common pressure container (14) to the intake tract (4) of the internal combustion engine and including an adjustable check valve (19) for controlling the gas recirculation flow from the common pressure container (14) to the intake tract (4), said method comprising the steps of: in the engine braking mode, controlling the opening of the brake valves (15) at the cylinders (2), and at the same time controlling the check valve (19) in the recirculation line (18) as well as the outflow valve (17) for controlling the backpressure of the engine brake valves (15) and the braking power generated by the engine.

10. The method as claimed in claim 9, wherein, in the engine braking mode, the outflow valve (17) in the outflow line (16) between the gas pressure container (14) and the exhaust strand (6) is moved toward the closed position.

11. The method as claimed in claim 9, wherein the position of the outflow valve (17) is controlled in order to realize a cruise control function.

12. The method as claimed in claim 9, wherein the variable turbine geometry (10) is controlled in order to realize a cruise control function.

* * * * *